United States Patent [19]
Heimann

[11] Patent Number: 5,193,381
[45] Date of Patent: Mar. 16, 1993

[54] UNIVERSAL PRESSURIZING ADAPTOR FOR AUTOMOTIVE RADIATORS

[76] Inventor: Daniel E. Heimann, 252B Oliphant La., Middletown, R.I. 02840

[21] Appl. No.: 851,796

[22] Filed: Mar. 16, 1992

[51] Int. Cl.⁵ .............................................. G01M 3/32
[52] U.S. Cl. ...................................................... 73/49.7
[58] Field of Search ........................... 73/49.7, 40, 45.8

[56] References Cited

U.S. PATENT DOCUMENTS

| | | | |
|---|---|---|---|
| 2,847,851 | 8/1958 | Enell | 73/40 |
| 2,893,238 | 7/1959 | Kayser | 73/40 |
| 2,940,301 | 6/1960 | Hughes et al. | 73/40 |
| 2,940,303 | 6/1960 | Enell | 73/49.7 X |
| 2,981,095 | 4/1961 | Eshbaugh | 73/40 |
| 3,035,435 | 5/1962 | Johnson | 73/40 |
| 3,115,031 | 12/1963 | Harry | 73/40 |
| 3,138,949 | 6/1964 | Pipes | 73/45.8 X |
| 3,313,144 | 4/1967 | Johnson | 73/49.7 |
| 3,650,147 | 3/1972 | Moyer | 73/49.7 |
| 3,680,361 | 8/1972 | Taylor | 13/49.2 |
| 4,235,100 | 11/1980 | Branchini | 73/49.7 |
| 4,494,402 | 1/1985 | Carney | 73/40 |
| 4,679,424 | 7/1987 | Tubman | 73/45.8 |
| 4,809,542 | 3/1989 | Jones | 73/45.8 |
| 5,105,653 | 4/1992 | Konter | 73/40 X |

Primary Examiner—Hezron E. Williams
Assistant Examiner—Joseph W. Roskos
Attorney, Agent, or Firm—Salter, Michaelson & Benson

[57] ABSTRACT

A universal pressurizing adaptor for pressurizing an engine cooling system in leak testing is connectible to the cooling system of an automotive vehicle. The adaptor includes a cylindrical body having an adaptor neck located at one end, and an overflow vent and a flexible adaptor hose attached to an outlet neck located at the other end of the adaptor. The adaptor neck is connectible to a conventional pressure cap of a pressurizing pump and the adaptor hose is connectible to the overflow vent joined to the filler neck of the radiator of the automotive vehicle.

6 Claims, 1 Drawing Sheet

UNIVERSAL PRESSURIZING ADAPTOR FOR AUTOMOTIVE RADIATORS

BACKGROUND OF THE INVENTION

The instant invention relates to pressurizing devices for leak testing of engine cooling systems and more particularly relates to a universal pressurizing adaptor for automotive cooling systems.

Testing for leaks in an automotive engine cooling system is normally accomplished by pressurizing the cooling system through the use of a pressurizing device. Typically, the pressurizing devices include a pump, a pressure gauge associated with the pump, and a pressure cap which is connected via a flexible conduit to the outlet of the pump. The pressure cap is especially designed to fit onto a conventionally designed filler neck found on radiators of most older vehicles. To pressurize the cooling system, the filler cap of the radiator is removed, and the pressure cap of the pressurizing pump is mounted on the filler neck of the radiator. Air is then pumped into the cooling system and leaks can thereafter be determined by checking for excessive coolant fluid escaping from any of the cooling system components or fittings. When the pressurizing pump includes a pressure gauge, the pressure of a leak in the system can also be detected by pressurizing the cooling system to a predetermined pressure and then watching the gauge for any significant drop in pressure.

The general concept of using adaptors for fitting onto the filler neck of a radiator in the pressurizing of engine cooling systems is well known in the art. In this regard, the U.S. Pat. No. 2,981,095 to Eshbaugh; U.S. Pat. No 3,650,147 to Moyer; U.S. Pat. No. 3,680,361 to Taylor; U.S. Pat. No. 4,235,100 to Branchini; U.S. Pat. No. 4,679,424 to Tubman; U.S. Pat. No. 4,809,542 to Jones; and U.S. Pat. No. 4,494,402 to Carney, which represent the closest prior art to the subject invention of which the applicant is aware, disclose various devices and adaptors which attach to the filler neck of an automotive radiator in the pressurization of engine cooling systems.

It has been found that it is becoming increasingly difficult to utilize conventional pressurizing devices on various types of modern automobile radiators, especially in foreign cars, since the filler neck on each radiator is designed differently. Thus, it is necessary to purchase an adaptor for each different type of radiator in order to use the conventional pressurizing pump and pressure cap. It is well known that there are a multitude of different types of automobile radiators which are presently on the market, and therefore it is neither practical nor economical to purchase an adaptor for each different type of radiator. Accordingly, it has been determined that there is a need for a universal pressurizing adaptor which can be utilized in combination with a conventional pressurizing device.

SUMMARY OF THE INVENTION

The instant invention provides a universal pressurizing adaptor for pressurizing any one of a plurality of different engine cooling systems.

The universal adaptor operates in combination with a conventional pressurizing device comprising an air pump and a conventional pressure cap attached to an outlet of the pump. The adaptor comprises a cylindrical body having an adaptor neck located at one end, a pressure relief vent extending from the adaptor neck, a reduced diameter outlet neck at the other end of the cylindrical body, and an elongated adaptor hose attached to the outlet neck. The adaptor neck is connectible to the pressure cap of the conventional pressurizing device, and the adaptor hose is connectible to a pressure relief vent on any one of a plurality of different cooling systems. Normally, the pressure relief vent on the filler neck of the vehicle radiator is adequate for use as a connector to the subject invention. However, the adaptor hose may be connected to any convenient pressure relief vent tube or overflow vent of the vehicle cooling system. The cooling system is then pressurized in a normal manner by pumping air through the pressure relief vent tube. During testing, the pressure relief vent tube for the adaptor acts as a pressure relief vent of the radiator. When testing is completed, the pressure cap is released from the adaptor neck and the cylindrical adaptor body is effective for receiving any overflow from the cooling system due to back pressure in the cooling system to prevent the overflow from spilling into the engine compartment.

Accordingly, it is an object of the instant invention to provide a universal pressurizing adaptor for pressurizing any one of a plurality of different engine cooling systems.

It is another object of the instant invention to provide a radiator adaptor which is effective for receiving coolant overflow due to back pressure in the cooling system.

It is yet another object of the instant invention to provide a universal pressurizing adaptor which can be used in combination with a conventional pressurizing device.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figures 1, 2:
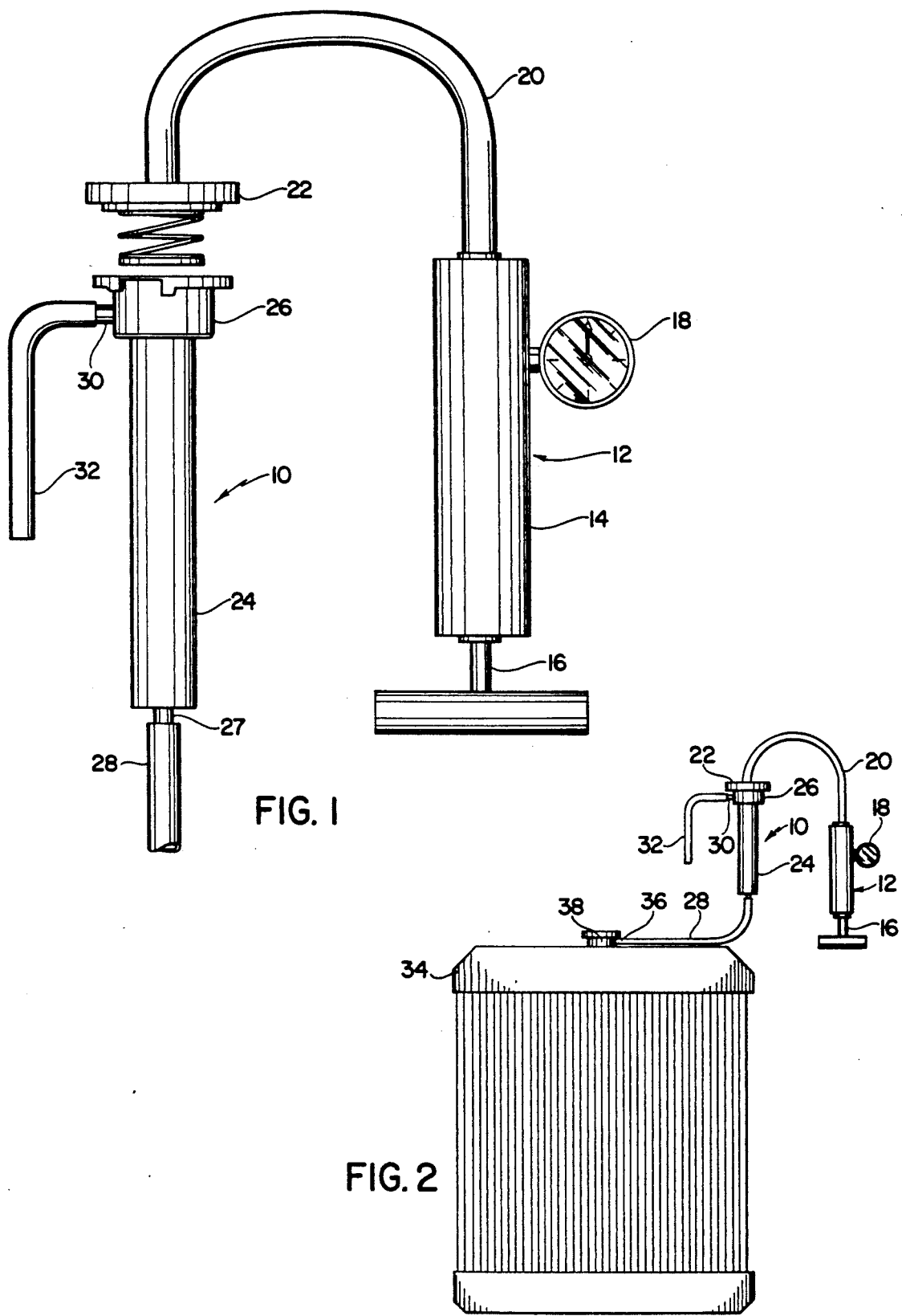
FIG. 1 is a front elevational view of the adaptor of the instant invention that is shown being interconnectible with a conventional pressurizing pump and pressure cap.
FIG. 2 is a front elevational view of the adaptor and pressurizing pump with the adaptor connected to the pressure relief vent tube of an automotive radiator.

Referring now to the drawing, and particularly to FIG. 1, the universal adaptor of the instant invention is illustrated and is generally indicated at 10. The adaptor 10 is intended to be operable in combination with the conventional pressurizing device generally indicated at 12. The pressurizing device 12 comprises a pump cylinder 14 having a pump piston 16 extending therein, a pressure gauge 18, an outlet hose 20, and a conventional spring-biased pressure cap 22 attached at the distal end of the outlet hose 20.

The adaptor 10 preferably comprises an elongated cylindrical body 24 defining a pressure chamber, an enlarged adaptor neck 26 being joined at one end to the cylindrical body 24 for receiving the pressure cap 22. An outlet neck 27 is joined to the other end of the cylindrical body 24, and a flexible adaptor hose 28 is attached to the outlet neck 27 of the adaptor 10. The adaptor 10 further includes a pressure relief vent tube 30 that extends radially outwardly from the adaptor neck 26, a flexible vent hose 32 being attached to the pressure relief vent tube 30.

For use and operation of the adaptor 10 in pressurizing a cooling system, the adaptor neck 26 is connectible to the pressure cap 22 of the pressurizing device 12 and the adaptor hose 28 is connectible to a pressure relief vent tube of any one of a plurality of vent locations of the automobile cooling system to be checked. Normally, the pressure relief vent tube as mounted on the filler neck of a radiator is adequate for locating the adaptor 10 in place. However, it has been found that the leak testing of some radiators may not be conclusive when using a pressure relief vent on the filler neck thereof, and therefore the adaptor may be utilized as a universal adaptor for attachment to any one of a plurality of different cooling systems vents during the pressurizing thereof. Thus, where the radiator filler neck does not include a relief vent or the relief vent on the radiator will not provide proper pressurizing of the coolant system, the adaptor hose 28 may be connected to any convenient pressure relief vent or overflow vent of the cooling system.

Referring now to FIG. 2, the adaptor 10 and pressurizing pump 12 are illustrated with the adaptor 10 connected to a radiator 34 of an automotive cooling system. Specifically, the adaptor hose 28 is connected to the pressure relief vent tube 36 on a filler neck 38 as fixed to the top of the radiator 34. The cooling system is pressurized in the normal manner by actuating the pump piston 16 whereby air is pumped through the pressure relief vent 36 into the system. Thereafter, normal testing procedures may be utilized in finding any leaks in the cooling system. During a testing period, the pressure relief vent tube 30 of the adaptor 10 replaces the vent tube 36 of the radiator 34 and serves to vent the cooling system in case of a pressure buildup. If there is coolant overflow from the cylindrical body 24 due to overpressuring the system during testing, the vent hose 32 can be utilized to direct the overflow coolant away from the engine compartment. When testing is completed and the pressure cap 22 is released from the adaptor neck 26, the elongated cylindrical body 24 is also effective for receiving any coolant overflow from the cooling system therein due to released back pressure. In this regard, the adaptor 10 prevents spillage of coolant into the engine compartment as often occurs when removing the pressure cap 22 from the filler neck of a radiator.

It is seen, therefore, that the instant invention provides an effective universal adaptor for pressurizing any one of a plurality of different cooling systems. The adaptor operates in combination with a conventional pressurizing pump, and the adaptor hose of the adaptor effectively attaches to the pressure relief vent tube on the filler neck of any type of vehicle radiator. The adaptor 10 also includes the pressure relief vent tube 30 that acts as a relief vent when the adaptor hose 28 is connected and further effective for receiving coolant overflow from the cylindrical body 24 due to backpressure when the pressure cap 22 is released. Accordingly, it is believed that the universal adaptor of the instant invention represents significant improvements in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A universal pressurizing adaptor for use in combination with a conventional pressurizing device for pressurizing a vehicle engine cooling system in leak testing thereof, said pressurizing device comprising pump means and a conventional pressure cap attached to said pump means, said adaptor comprising a pressure chamber having an adaptor neck connected to a first end thereof and a flexible outlet conduit connected to a second end thereof, said adaptor neck being connectible to said conventional pressure cap, and said outlet conduit being connectible to a selected overflow pressure relief vent of the engine cooling system.

2. In the adaptor of claim 1, said pressure chamber including a reduced diameter outlet neck at said second end thereof, said outlet conduit comprising an elongated flexible hose attached to said outlet neck.

3. In the adaptor of claim 1, said pressure chamber comprising a substantially elongated cylindrical body.

4. The adaptor of claim 1 further comprising overflow means.

5. In the adaptor of claim 4, said overflow means comprising an overflow vent tube projecting outwardly of said adaptor neck.

6. In the adaptor of claim 5, said overflow means further comprising an elongated flexible conduit attached to said overflow vent tube.

* * * * *